US010446355B2

(12) United States Patent
Tsang et al.

(10) Patent No.: US 10,446,355 B2
(45) Date of Patent: Oct. 15, 2019

(54) HYBRID DEVICE STRUCTURES INCLUDING NEGATIVE TEMPERATURE COEFFICIENT/POSITIVE TEMPERATURE COEFFICIENT DEVICE

(71) Applicant: Littelfuse, Inc., Chicago, IL (US)

(72) Inventors: Chun-Kwan Tsang, Morgan Hill, CA (US); Jianhua Chen, Sunnyvale, CA (US)

(73) Assignee: LITTELFUSE, INC., Chicago, IL (US)

( * ) Notice: Subject to any disclaimer, the term of this patent is extended or adjusted under 35 U.S.C. 154(b) by 8 days.

(21) Appl. No.: 15/499,317

(22) Filed: Apr. 27, 2017

(65) Prior Publication Data

US 2018/0315575 A1  Nov. 1, 2018

(51) Int. Cl.
| | |
|---|---|
| *H01C 7/02* | (2006.01) |
| *H01H 85/06* | (2006.01) |
| *H01H 85/143* | (2006.01) |
| *G01K 7/16* | (2006.01) |
| *H01C 7/04* | (2006.01) |

(52) U.S. Cl.
CPC ............... *H01H 85/06* (2013.01); *G01K 7/16* (2013.01); *H01C 7/021* (2013.01); *H01C 7/027* (2013.01); *H01C 7/041* (2013.01); *H01H 85/143* (2013.01); *H01C 7/043* (2013.01)

(58) Field of Classification Search
CPC .... H01H 85/06; H01H 85/048; H01H 85/143; H01H 2085/0483; G01K 7/16; H01C 7/021; H01C 7/027; H01C 7/041; H01C 7/043

USPC .......................................................... 337/296
See application file for complete search history.

(56) References Cited

U.S. PATENT DOCUMENTS

| | | | | |
|---|---|---|---|---|
| 2,258,646 A | * | 10/1941 | Grisdale | H01C 7/046 252/521.2 |
| 4,840,925 A | * | 6/1989 | Rousset | C01G 45/1221 423/594.3 |
| 2008/0006796 A1 | | 1/2008 | Khatua et al. | |
| 2009/0165289 A1 | * | 7/2009 | Deng | H01C 7/043 29/612 |
| 2011/0051778 A1 | * | 3/2011 | Kloiber | G01K 7/223 374/185 |
| 2011/0297891 A1 | | 12/2011 | Mercx et al. | |
| 2013/0200989 A1 | * | 8/2013 | Miura | H01C 7/008 338/22 SD |
| 2014/0205336 A1 | * | 7/2014 | Chu | H01C 7/021 399/333 |

(Continued)

OTHER PUBLICATIONS

"Effect of Cu and Fe addition on electrical properties of Ni—Mn—Co—O". Ceramics International. Available online May 17, 2012.*

(Continued)

*Primary Examiner* — Jacob R Crum

(57) ABSTRACT

A hybrid device, comprising: a first electrode, disposed on a first side of the hybrid device, a second electrode, disposed on a second side of the hybrid device, opposite the first side. The hybrid device may further include at least one layer, disposed between the first electrode and the second electrode, the at least one layer comprising a negative temperature coefficient material and a plurality of conductive particles, wherein the hybrid device exhibits a positive temperature coefficient characteristic and a negative temperature coefficient characteristic.

12 Claims, 3 Drawing Sheets

(56) References Cited

U.S. PATENT DOCUMENTS

| | | | | |
|---|---|---|---|---|
| 2016/0027561 A1* | 1/2016 | Inoue | ................ | H01G 4/30 |
| | | | | 338/20 |
| 2016/0265979 A1* | 9/2016 | Ihle | ................ | G01K 1/08 |
| 2016/0299011 A1* | 10/2016 | Ihle | ................ | G01K 1/08 |
| 2016/0338149 A1* | 11/2016 | Sweeney | ................ | H05B 3/141 |
| 2017/0004946 A1* | 1/2017 | Rutter, Jr. | ................ | H01B 1/22 |

OTHER PUBLICATIONS

European Search Report for the European Patent Application No. 18169539, dated Oct. 19, 2018, 2 pages.

\* cited by examiner

HYBRID DEVICE STRUCTURES INCLUDING NEGATIVE TEMPERATURE COEFFICIENT/POSITIVE TEMPERATURE COEFFICIENT DEVICE

BACKGROUND

Field

Embodiments relate to the field of surge protection devices, and more particularly to overvoltage protection devices and resettable fuses.

Discussion of Related Art

Conventional positive temperature coefficient (PTC) materials are used to provide t protection by relying on polymer composites that include conductive particles. Upon heating to a given temperature, the composite materials transition from a low resistance state to a high resistance state, due to changes in the polymer matrix, such as a melting transition or a glass transition. At such a transition temperature, often above room temperature, the polymer matrix may expand and disrupt the electrically conductive network, rendering the composite much less electrically conductive. This change in resistance imparts a fuse-like character to the PTC materials, which change may be reversible when the PTC material cools back to room temperature. This simple PTC behavior is useful for applications such as resettable fuses, where operation of a component is to be precluded above a threshold temperature. For example, a component may be starved of current by the PTC fuse once the PTC material transitions to a high resistance state above the transition temperature. While such behavior protects components at high temperatures, such PTC materials may not be ideal for applications where protection from operation at lower temperatures is desired. This result is because such PTC materials remain in a low resistance state at lower temperatures.

With respect to these and other considerations, the present disclosure is provided.

SUMMARY

Exemplary embodiments are directed to improved materials and devices based upon the PTC materials and NTC materials.

In one embodiment, a hybrid device may include a first electrode, disposed on a first side of the hybrid device, a second electrode, disposed on a second side of the hybrid device, opposite the first side. The hybrid device may further include at least one layer, disposed between the first electrode and the second electrode, the at least one layer comprising a negative temperature coefficient material and a plurality of conductive particles, wherein the hybrid device exhibits a positive temperature coefficient characteristic and a negative temperature coefficient characteristic.

In another embodiment, a hybrid device may include a first electrode, disposed on a first side of hybrid device; a second electrode, disposed on a second side of the hybrid device, opposite the first side; and a central layer, disposed between the first electrode and the second electrode, the central layer comprising: a polymer matrix; and a plurality of semiconductor particles, dispersed within the polymer matrix, wherein the hybrid device exhibits a negative temperature coefficient characteristic.

DESCRIPTION OF EMBODIMENTS

Figure 1:
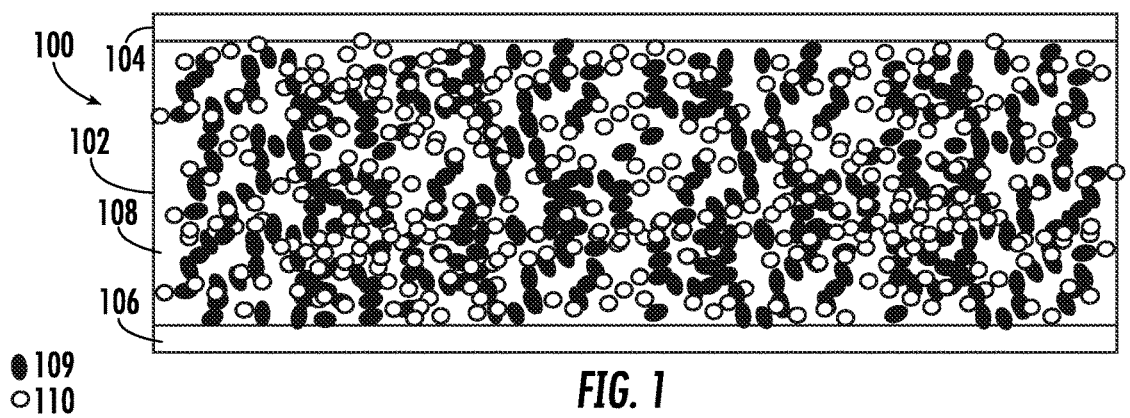
FIG. 1 presents a schematic view of a hybrid device according to embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, novel device structures and materials are provided for forming a hybrid device, where the hybrid device may have positive temperature coefficient (PTC) characteristics, as well as negative temperature coefficient (NTC) characteristics. The hybrid devices of the present embodiments may have a structure sharing some features of known PTC devices. For example, a hybrid device may include a first electrode, disposed on a first side of the hybrid device, a second electrode, disposed on a second side of the hybrid device, opposite the first side, as well as a negative temperature coefficient material and conductive particles, where these materials are disposed between the first electrode and the second electrode.

In various embodiments, the positive temperature coefficient characteristics may derive from a structure including a polymer matrix and a plurality of conductive particles, where the plurality of conductive particles are dispersed within the polymer matrix, similar to known PTC materials. In some embodiments, the plurality of conductive particles may be formed from a metal, metal ceramic, or other conductive material including, for example, tungsten carbide, titanium carbide, carbon, nickel, TiB2, TiN, ZrC, ZrB2, ZrN, or NbC. The embodiments are not limited in this context. In particular, non-limiting embodiments, the plurality of conductive particles may have a particle size between 0.1 μm and 100 μm. In various embodiments, the polymer matrix of a PTC material may be formed from a semicrystalline material such as polyvinylindene difluoride, polyethylene, polyethylene tetrafluoroethylene, ethylene-vinyl acetate, or ethylene butyl acrylate, or other materials having similar characteristics, including PFA (perfluoroalkoxyalkane), ETFE (ethylene tetrafluoroethylene), and ECTFE (ethylene chlorotrifluoroethylene). The embodiments are not limited in this context.

In some examples, the negative temperature coefficient (NTC) material may comprise a plurality of particles having a negative temperature coefficient. In particular examples, the plurality of particles of the NTC material are semiconductor particles. In various embodiments, the negative temperature coefficient material comprises a plurality of ceramic particles. In some embodiments, the plurality of ceramic particles comprises a spinel crystal structure oxide. More particularly, the plurality of ceramic particles may comprise a Ni—Mn—O material, a Ni—Mn—Cu—O material, a Ti—Fe—O material, an Al-modified spinel structure, or a Si-modified spinel structure. The embodiments are not limited in this context. In various embodiments, the plurality of NTC particles, such as ceramic particles, may be dispersed in a polymer matrix and may have a diameter of 0.01 μm to 100 μm. The embodiments are not limited in this context.

FIG. 1 presents a schematic view of a hybrid device 100 according to embodiments of the disclosure. In the hybrid device 100, a central layer 102 is disposed between a first electrode 104 and a second electrode 106. In this embodiment, the central layer 102 may include both a negative temperature coefficient material and a positive temperature coefficient material. Said differently, the central layer 102 may include a material that acts as both a negative temperature coefficient material and a positive temperature coefficient material, albeit in different temperature ranges. For example, the central layer 102 may comprise a polymer matrix 108 that is formed from a first polymer material, including any of the aforementioned polymer materials. The central layer 102 may also include a plurality of negative temperature coefficient particles, shown as open circles, disposed in the polymer matrix 108. According to various embodiments, the central layer 102 may also include a plurality of conductive particles, disposed in the polymer matrix 108, which particles are shown as dark ovals. In the example of FIG. 1, the conductive particles 109 and negative temperature coefficient particles 110 may be dispersed throughout the polymer matrix 108, and may be microscopic in size, such as having particle diameters of 100 μm or less. In various embodiments, the volume fraction of NTC particles may range from 5% to 70%, the volume fraction of conductive particles 109 may range from 5% to 70%, while the volume fraction of the sum of NTC particles and conductive particles 109 may range from 10% to 70%.

Figure 2:
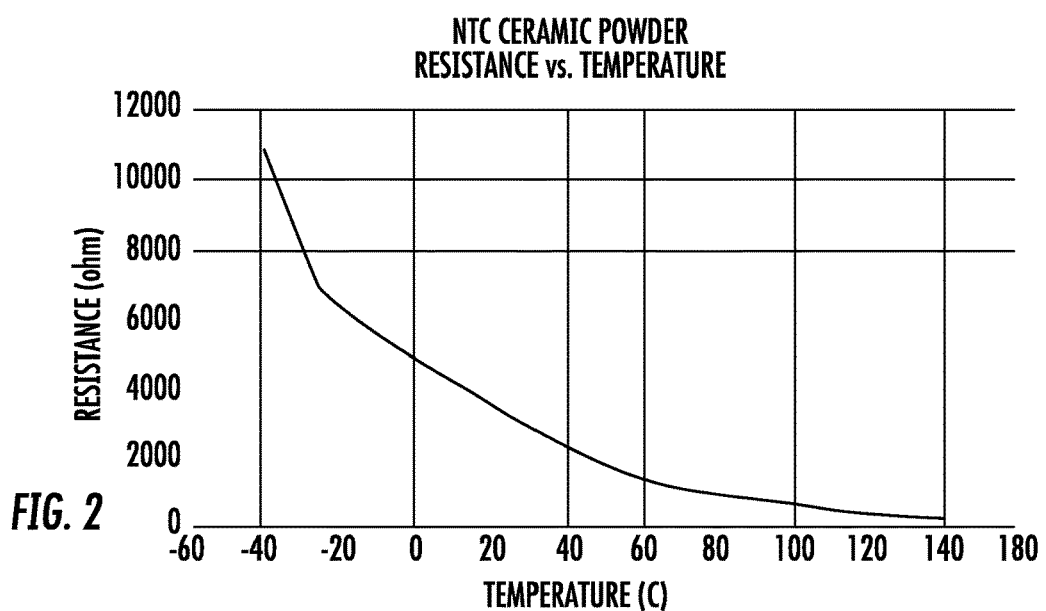
FIG. 2 presents an example of electrical properties of exemplary NTC particles according to embodiments of the disclosure.
Figure 3:
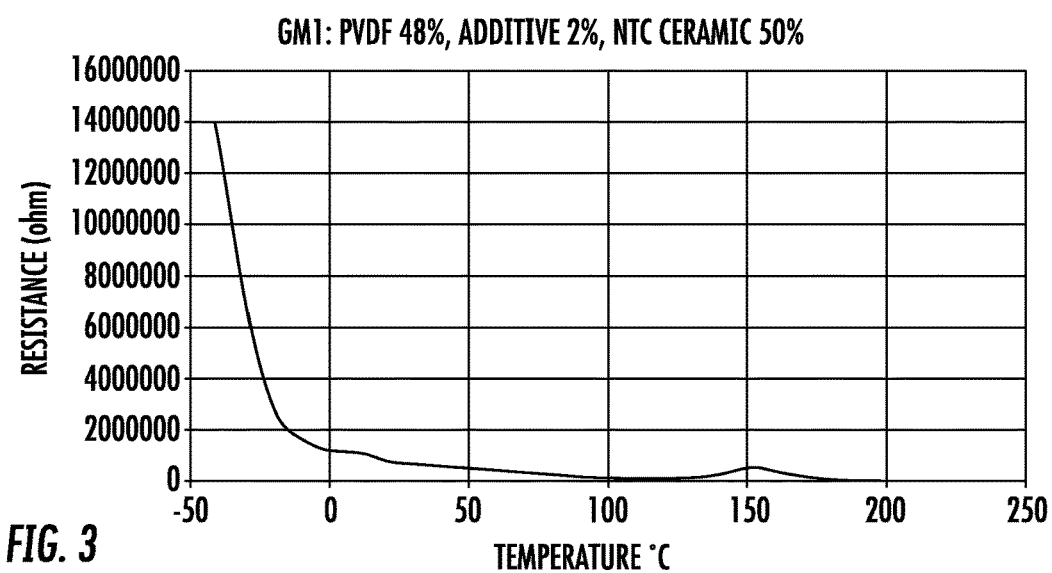
FIG. 3 presents an example of electrical properties of an exemplary NTC material according to embodiments of the disclosure.

As noted, the negative temperature coefficient particles may be semiconductor particles, ceramic particles, or other particles that exhibit a negative temperature coefficient behavior. FIG. 2 presents an example of electrical properties of exemplary NTC particles according to embodiments of the disclosure. The electrical resistance is shown as a function of temperature for a ceramic NTC powder (Ni—Mn—O) placed in a sample cell. As shown, the electrical resistance decreases with increasing temperature by approximately a factor of 40, between −40° C. and 140° C. When such a ceramic powder is dispersed in a polymer matrix at an appropriate concentration or volume fraction, the resultant electrical properties may also show NTC behavior. FIG. 3 presents an example of experimentally measured electrical properties of an exemplary NTC material according to embodiments of the disclosure. In this example, the NTC material is formed from a polymer matrix of 48% polyvinylidene difluoride. An NTC ceramic of 50% by volume is dispersed in the polymer matrix, including an additional 2% additive. As evident, the electrical resistance also decreases drastically with increasing temperature, by a factor of approximately two orders of magnitude between −40° C. and 200° C.

Figure 4:
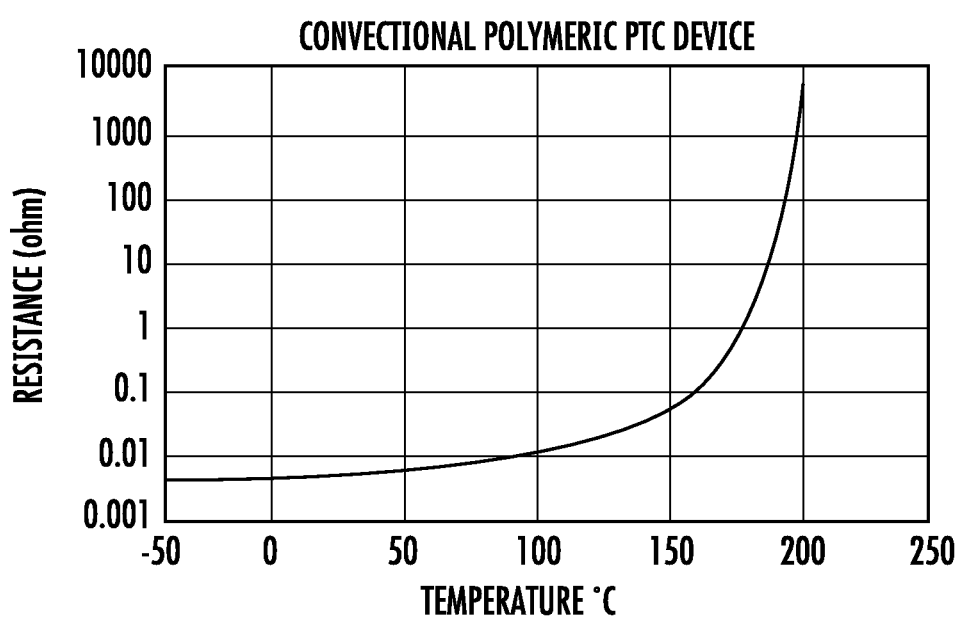
FIG. 4 provides a characteristic electrical behavior of a PTC material.

When a PTC material, or a PTC-forming material, such as conductive particles, is added to a polymer matrix having NTC particles, the resulting hybrid device as generally depicted in FIG. 1 may exhibit characteristics of both PTC devices as well as NTC materials. As an example, FIG. 4 provides a characteristic electrical behavior of a PTC material. As shown, at lower temperatures, in the low resistance state, the electrical resistance is relatively lower, and increases very little as a function of increasing temperature. At a given temperature, a rapid increase in electrical resistance takes place as a function of increasing temperature, where the PTC material enters a high resistance state. In the high resistance state, the electrical resistance is much higher than in the low resistance state, such as two orders of magnitude, three orders of magnitude, or four orders of magnitude higher. Once in the high resistance state, the electrical resistance of the PTC material may increase much more slowly with increasing temperature, or in some cases not at all. The current-limiting action of the PTC material at high temperatures accordingly is tripped when the PTC material transitions from the low resistance state to the high resistance state, which transition is characterized by a temperature that depends on the materials used to form the PTC material. For example, a polymer matrix material may undergo a melting or glass transition over a small temperature range where the polymer matrix rapidly expands. This temperature range may be set according to the polymer material and the application of the PTC material. For some applications, a useful transition temperature may be in the range of 160° C. to 180° C. The embodiments are not limited in this context.

Figure 5:
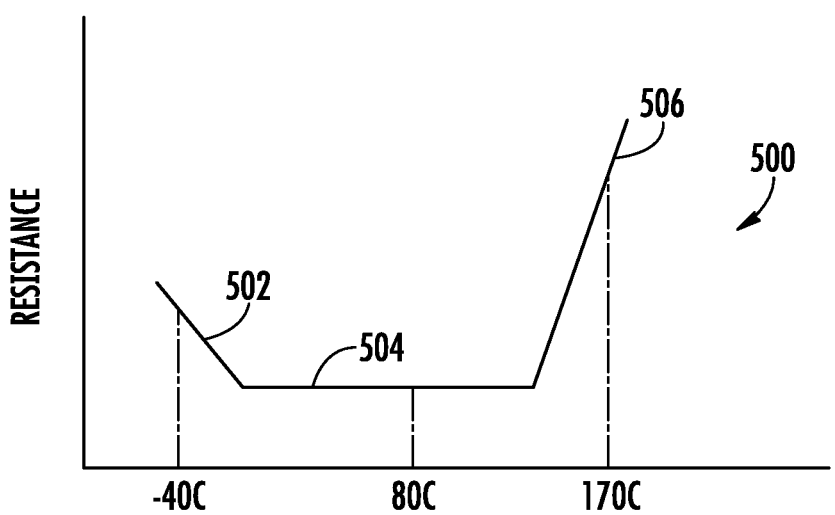
FIG. 5 depicts an exemplary curve, showing electrical behavior of a hybrid device having a PTC material and an NTC material formed together in a configuration shown in FIG. 1.

FIG. 5 depicts a curve 500, showing electrical behavior of a hybrid device having a PTC material and an NTC material formed together, such as in the configuration shown in FIG. 1. The curve 500 shows electrical resistance between opposite electrodes of a device, as a function of temperature, including a low temperature regime 502, intermediate temperature regime 504, and high temperature regime 506. As illustrated, in the low temperature regime 502, the resistance drops with increasing temperature, characteristic of an NTC material. The electrical resistance decreases up until approximately −10° C., above which temperature, the electrical resistance is relatively unchanged. Said differently, when the temperature decreases below −10° C., the electrical resistance undergoes a sharp increase. In the intermediate temperature regime 504, between −10° C. and 130° C., the resistance is low and changes little with increasing temperature. In the high temperature regime 506, above 130° C., the resistance increases sharply, characteristic of a PTC device.

Accordingly, the electrical behavior exhibited in curve 500 provides low electrical resistance in a window extending from −10° C. to 130° C., and a higher electrical resistance at temperatures that are lower than or higher than the temperatures in the window. When embodied in a hybrid device, such as the hybrid device 100, this electrical behavior may serve to protect components from operation at excessively low temperatures, such as below approximately −40° C., or at excessively high temperatures, such as above approximately 150° C. Without limitation as to any particular theory, the electrical behavior shown in FIG. 5 may be explained in the following manner. In the intermediate temperature regime 504, the NTC particles of the hybrid device 100 have relatively lower electrical resistance, while the conductive particles 109 also provide low electrical resistance electrical paths within the polymer matrix 108, from the first electrode 104 to the second electrode 106. Together, the NTC particles and conductive particles 109 provide an overall low electrical resistance to the hybrid device 100. In the low temperature regime, the electrical resistance of the (semiconducting) NTC particles increases as a function of decreasing temperature, contributing to an overall increase in electrical resistance between the first electrode 104 and second electrode 106. In the high temperature regime, while the NTC particles may exhibit low electrical resistance, the change in the polymer matrix 108, such as a glass transition or melting transition, causes the electrical paths defined by the conductive particles 109 (as well as the NTC particles) between first electrode 104 and second electrode 106 to be disrupted, leading to an overall increase in resistivity.

In other embodiments of the disclosure, a hybrid device may include multiple layers between electrodes. For example, in some embodiments, a hybrid device may include a first layer, disposed adjacent a first electrode, where the first layer comprises a polymer matrix comprising a first polymer material, as well as a plurality of negative temperature coefficient particles, dispersed in the polymer matrix. The first layer may also include a plurality of conductive particles, dispersed in the polymer matrix. The hybrid device may further include a second layer, disposed between the first layer and a second electrode, where the second layer comprises a positive temperature coefficient layer. As such, the second layer may be composed of conductive particles dispersed in a polymer matrix. Said differently, the first layer of this embodiment may resemble the central layer of the embodiment of FIG. 1, while the second layer may be similar to a known PTC layer having just a set of conductive particles dispersed in a polymer matrix.

Figure 6:
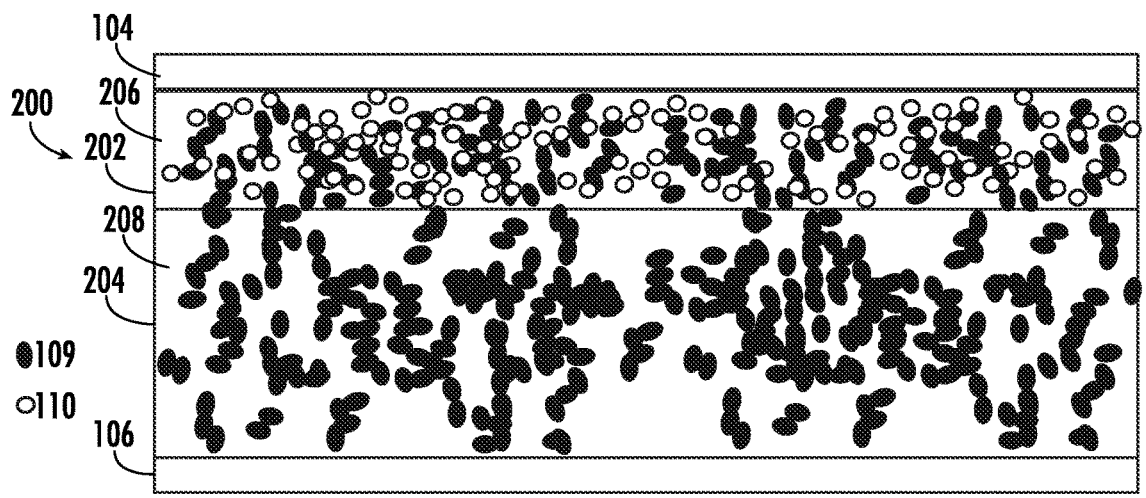
FIG. 6 presents a schematic view of a further hybrid device according to embodiments of the disclosure.

FIG. 6 depicts a hybrid device 200 according to further embodiments of the disclosure, where the hybrid device 200 contains a first layer 202 and second layer 204, arranged in electrical series between the first electrode 104 and the second electrode 106. In this embodiment, the first layer 202 may have a similar configuration as the central layer 102, described above, including NTC particles, conductive particles 109, and a polymer matrix 206. The second layer 204 may include a polymer matrix 208 that contains conductive particles 109, but not NTC particles. As such, neglecting the properties of the first layer 202, the second layer 204 may exhibit properties similar to a known polymer based PTC device. Together, the first layer 202 and the second layer 204 may impart electrical properties generally as shown in FIG. 5 and described above. Notably, the hybrid device 200 provides a configuration that facilitates tuning of the electrical properties by adjusting one or more parameters. For example, the relative thickness of the first layer 202 and second layer 204 may be adjusted to optimize the electrical properties of the hybrid device 200. In one example, the thickness of the first layer 202 may be approximately 1 mil, while the thickness of the second layer 204 is 10 mil to 20 mil. Additionally, a first polymer material used in the polymer matrix 206 may, but need not, differ from a second polymer material used in the polymer matrix 208.

In other embodiments, a hybrid device may include multiple layers where the particles in a first layer differ from the particles in a second layer. For example, in some embodiments a hybrid device may include a first layer, where the first layer is disposed adjacent a first electrode, and includes a polymer matrix and negative temperature coefficient particles, disposed in the polymer matrix. The hybrid device may also include a second layer, disposed between the first layer and the second electrode, where the second layer comprises a positive temperature coefficient layer. As such, the first layer may contain just NTC particles, while the second layer contains just conductive particles, that is, PTC-forming particles.

Figure 7:
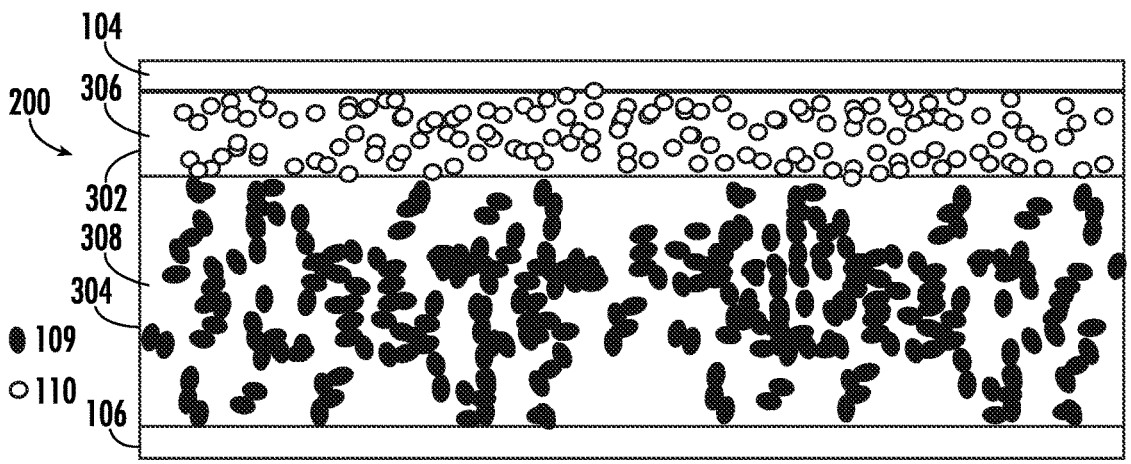
FIG. 7 presents a schematic view of another hybrid device according to additional embodiments of the disclosure.

FIG. 7 depicts a hybrid device 300 according to further embodiments of the disclosure, where the hybrid device 300 contains a first layer 302 and a second layer 304, arranged in electrical series between the first electrode 104 and the second electrode 106. In this embodiment, the first layer 302 may be composed of a polymer matrix 306 that includes NTC particles, as indicated by the open circles, but lacks conductive particles 109. The second layer 304 may be composed of a polymer matrix 308 that includes conductive particles 109, as indicated by the dark ovals, but lacks NTC particles. Notably, the polymer matrix 306 may be composed of a first polymer material that is different from a second polymer material that forms the polymer matrix 308. In operation, the hybrid device may exhibit electrical properties generally as shown in FIG. 5. In the intermediate temperature regime 504, the conductive particles 109 may form continuous, low resistance, electrical paths across the second layer 304 (in the direction perpendicular to the surface of the hybrid device 700). Similarly, the NTC particles may form low resistance electrical paths across the first layer 302. In the low temperature regime 502, the NTC particles experience an increase in electrical resistance, imparting a higher electrical resistance across the first layer 302, and accordingly increasing the overall resistance between the first electrode 104 and the second electrode 106. In the high temperature regime 506, by virtue of the melting or glass transition of the polymer matrix 308, the conductive particles 109 no longer form electrically continuous paths across the second layer 304, imparting a higher resistance across the second layer 304, and accordingly increasing the overall resistance between the first electrode 104 and the second electrode 106.

Figure 8:
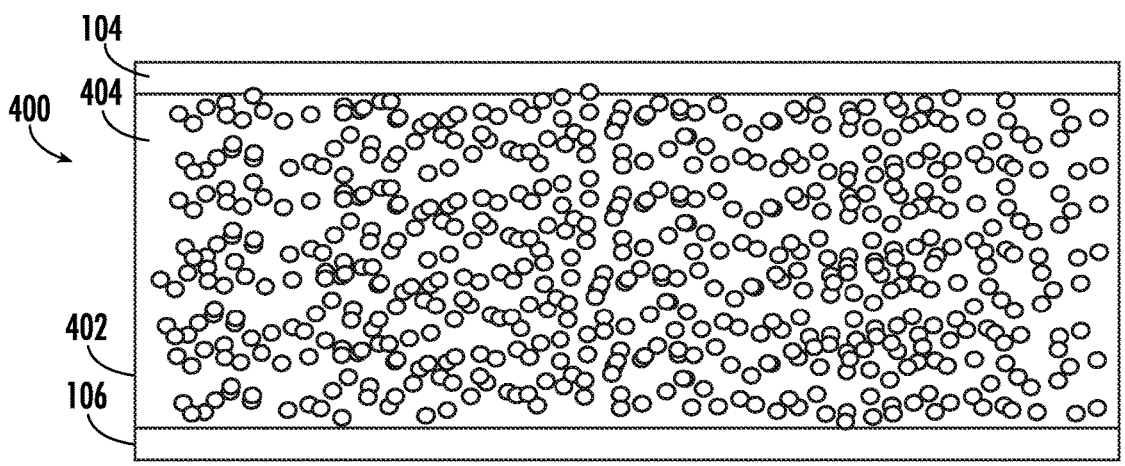
FIG. 8 presents a schematic view of another hybrid device according to further embodiments of the disclosure.

FIG. 8 depicts a hybrid device 400 according to further embodiments of the disclosure, where the hybrid device 400 contains a central layer 402. In this embodiment, the central layer 402 may have a similar configuration as the first layer 302, described above, including NTC particles, and a polymer matrix 404. In this embodiment, the hybrid device 400 may act as a "low temperature fuse," imparting electrical properties similar to the properties shown in FIG. 3. This type of operation may be appropriate for protecting devices where operation at low temperatures, such as below −40 C, is to be prevented. Additionally, a polymeric NTC device may act as a temperature sensor where the known resistance change as a function of temperature of the NTC device may be used to indicate temperature.

In the aforementioned embodiments, while certain specific temperature ranges have been discussed in conjunction with low temperature regime, intermediate temperature regime, and high temperature regime, according to different embodiments, the exact temperatures that define these regimes may be adjusted by adjusting one or more parameters. Among these parameters are the volume fraction of conductive particles; the shape of conductive particles; the type of polymer material, such as thermoset, thermoplastic, crystalline, semi-crystalline, amorphous; the transition temperature of a polymer; the type of ceramic material and composition of the ceramic used for NTC particles, the shape of the NTC particles, the doping of a ceramic structure with additives such as Si or Al, among other factors. Similarly, the electrical resistance of the intermediate temperature regime, as well as the change in resistance in the low temperature regime and high temperature regime may be adjusted by adjusting one or more of the aforementioned parameters.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A hybrid device, comprising:
   a first electrode disposed on a first side of the hybrid device;
   a second electrode disposed on a second side of the hybrid device, opposite the first side; and
   a first layer disposed between the first electrode and the second electrode, the first layer comprising a first plurality of conductive particles and a plurality of negative temperature coefficient particles dispersed among one another in a first polymer matrix comprising a first polymer material;
   a second layer disposed between the first layer and the second electrode, the second layer comprising a second plurality of conductive particles dispersed in a second polymer matrix comprising a second polymer material, wherein the second layer does not contain any negative temperature coefficient particles;
   wherein the first electrode is in direct contact with the first layer and the second electrode is in direct contact with the second layer; and
   wherein the first and second pluralities of conductive particles exhibit a positive temperature coefficient characteristic and the negative temperature coefficient particles exhibit a negative temperature coefficient characteristic.

2. The hybrid device of claim 1, wherein the plurality of negative temperature coefficient particles comprises a plurality of semiconductor particles.

3. The hybrid device of claim 1, wherein the plurality of conductive particles are dispersed within a polymer matrix.

4. The hybrid device of claim 3, wherein the plurality of negative temperature coefficient particles comprises a plurality of semiconductor particles, the plurality of semiconductor particles being dispersed within the polymer matrix.

5. The hybrid device of claim 3, wherein the plurality of conductive particles comprises tungsten carbide, titanium carbide, carbon, or nickel, $TiB_2$, TiN, ZrC, $ZrB_2$, ZrN, NbC.

6. The hybrid device of claim 3, wherein the plurality of conductive particles comprises a particle size between 0.1 μm and 100 μm.

7. The hybrid device of claim 1, wherein the plurality of negative temperature coefficient particles comprises a plurality of ceramic particles.

8. The hybrid device of claim 7, wherein the plurality of ceramic particles comprises an oxide having a spinel crystal structure.

9. The hybrid device of claim 8, wherein the plurality of ceramic particles comprises a Ni—Mn—O material, a Ni—Mn—Cu—O material, a Ti—Fe—O material, an Al-modified spinel structure, or a Si-modified spinel structure.

10. The hybrid device of claim 7, wherein the plurality of ceramic particles comprises a diameter of 0.01 μm to 100 μm.

11. The hybrid device of claim 4, wherein the polymer matrix comprises polyvinylindene difluoride, polyethylene, polyethylene tetrafluoroethylene, ethylene-vinyl acetate, or ethylene butyl acrylate, PFA, ETFE, and ECTFE.

12. The hybrid device of claim 1, wherein the first layer comprises a sum of a volume fraction of the NTC particles and a volume fraction of the conductive particles is between 10% and 70%.

* * * * *